(12) United States Patent
Choudhury et al.

(10) Patent No.: US 8,601,153 B2
(45) Date of Patent: Dec. 3, 2013

(54) SYSTEM AND METHOD FOR OPTIMIZING MEDIA PLAYBACK QUALITY FOR A WIRELESS HANDHELD COMPUTING DEVICE

(75) Inventors: Sayeed Z. Choudhury, New York City, NY (US); Rajiv K. Vijayakumar, San Diego, CA (US); Idris Mir, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 12/897,511

(22) Filed: Oct. 4, 2010

(65) Prior Publication Data
US 2011/0106969 A1 May 5, 2011

Related U.S. Application Data

(60) Provisional application No. 61/252,621, filed on Oct. 16, 2009.

(51) Int. Cl.
*G06F 15/16* (2006.01)
(52) U.S. Cl.
USPC ............................ 709/236; 709/231; 709/233
(58) Field of Classification Search
USPC ......................................... 709/231, 233, 236
See application file for complete search history.

(56) References Cited

U.S. PATENT DOCUMENTS

| | | | |
|---|---|---|---|
| 6,400,996 B1 | 6/2002 | Hoffberg et al. | |
| 7,006,881 B1 | 2/2006 | Hoffberg et al. | |
| 2001/0045962 A1 | 11/2001 | Lee et al. | |
| 2002/0013635 A1 | 1/2002 | Gotou et al. | |
| 2003/0233464 A1 | 12/2003 | Walpole et al. | |
| 2005/0240676 A1 | 10/2005 | Moon | |
| 2005/0246751 A1* | 11/2005 | Boyce et al. | 725/101 |
| 2006/0168290 A1 | 7/2006 | Doron | |

(Continued)

FOREIGN PATENT DOCUMENTS

| EP | 1936879 A1 | 6/2008 |
|---|---|---|
| EP | 1965564 A1 | 9/2008 |

(Continued)

OTHER PUBLICATIONS

Alex Zambelli,"IIS Smooth Streaming Technical Overview", Microsoft Mar. 25, 2009, XP002620446, Retrieved from the Internet: URL:http://www.microsoft.com/downloads/en/details.aspx?FamilyID=03d22583-3ed6-44da-8464-blb4b5ca7520, [retrieved on Jan. 21, 2011].

(Continued)

*Primary Examiner* — Patrice Winder
*Assistant Examiner* — Ebrahim Golabbakhsh
(74) *Attorney, Agent, or Firm* — Nicholas A. Cole

(57) ABSTRACT

A method for optimizing media playback quality for a wireless handheld computing device is disclosed. The system includes a client request manager that may be responsible for controlling or instructing a web browser on what file segments should be downloaded next to the wireless handheld mobile computing device to insure optimal video playback quality for the computing device. The request manager may be dynamic in that it may continually monitor elements of an application subsystem as well as the modem subsystem. The request manager may select one or more file segments for download that optimizes media playback on the wireless handheld computing device based on the data received from at least one of the application subsystem and modem subsystem.

32 Claims, 9 Drawing Sheets

(56) References Cited

U.S. PATENT DOCUMENTS

| | | |
|---|---|---|
| 2007/0091815 A1 | 4/2007 | Tinnakornsrisuphap et al. |
| 2007/0091920 A1 | 4/2007 | Harris et al. |
| 2007/0299936 A1 | 12/2007 | Borgendale et al. |
| 2008/0151405 A1 | 6/2008 | Kurtas et al. |
| 2008/0172747 A1* | 7/2008 | Hurtado et al. ................. 726/26 |
| 2008/0270532 A1* | 10/2008 | Billmaier et al. ............. 709/203 |
| 2008/0310446 A1 | 12/2008 | Bellwood et al. |
| 2008/0313351 A1 | 12/2008 | Mobasser |
| 2009/0017860 A1 | 1/2009 | Cole |
| 2009/0077599 A1 | 3/2009 | Appelquist et al. |
| 2009/0094279 A1* | 4/2009 | Carmeli et al. ............ 707/104.1 |
| 2009/0216897 A1 | 8/2009 | Wang |
| 2009/0279547 A1 | 11/2009 | Mistry et al. |
| 2010/0021138 A1 | 1/2010 | Perrault et al. |
| 2010/0115472 A1 | 5/2010 | Lee et al. |
| 2010/0121709 A1* | 5/2010 | Berezin et al. ............. 705/14.51 |
| 2010/0306810 A1* | 12/2010 | Brooks et al. ................. 725/109 |
| 2011/0093605 A1 | 4/2011 | Choudhury et al. |
| 2011/0119587 A1* | 5/2011 | Joy et al. ...................... 715/720 |
| 2011/0164689 A1* | 7/2011 | De Neve et al. ......... 375/240.25 |
| 2011/0178610 A1 | 7/2011 | O'connor et al. |
| 2011/0216832 A1* | 9/2011 | Wang ....................... 375/240.16 |
| 2011/0239078 A1* | 9/2011 | Luby et al. ..................... 714/752 |
| 2012/0045054 A1 | 2/2012 | Main et al. |
| 2012/0208512 A1* | 8/2012 | Maharajh et al. .......... 455/414.1 |
| 2012/0272285 A1* | 10/2012 | Brooks et al. ................. 725/146 |

FOREIGN PATENT DOCUMENTS

| | | | |
|---|---|---|---|
| JP | 2005267218 A | | 9/2005 |
| JP | 2006500808 A | | 1/2006 |
| JP | 2011504036 A | | 1/2011 |
| WO | 2005069108 A1 | | 7/2005 |
| WO | 2006012911 A1 | | 2/2006 |
| WO | 2007047031 A2 | | 4/2007 |
| WO | 2009009166 A1 | | 1/2009 |
| WO | 2009064066 A1 | | 5/2009 |

OTHER PUBLICATIONS

Claudio Bettini et al.,"Distributed Context Monitoring for the Adaptation of continuous Services",World Wide Web; Internet and Web Information Systems, Kluwer Academic Publishers, DO vol. 10,No. 4,Jun. 28, 2007,pp. 503-528,XP019558067,ISSN:1573-1413, DOI:10.1007/S11280-007-0028-7 pp. 503-511.

International Search Report and Written Opinion—PCT/US2011/049834—ISA/EPO—Dec. 6, 2011.

Lakshman K et al.,"Integrated CPU and network-I/O QoS management in an end system",Computer Communications,Elsevier Science Publishers BV, Amsterdam, NL,vol. 21,No. 4,Apr. 10, 1998,pp. 325-333,XP004115275,ISSN:0140-3664,DOI:10.1016/S0140-3664(97)00166-7 p. 325-328.

3rd Generation Partnership Project; Technical Specification Group Services and System Aspects Transparent end-to-end Packet-switched Streaming Service (PSS); Progressive Download and Dynamic Adaptive Streaming over HTTP (3GP-DASH) (Release 10), Technical Specification, V1.0.0 (Sep. 2010).

International Search Report and Written Opinion—PCT/US2010/052943, International Search Authority—European Patent Office—Feb. 24, 2011.

Os, Ed. et al, HTTP Live Streaming, http://tools.ietf.org/html/draft-pantos-http-live-streaming-04, Oct. 4, 2010.

Serif, Tacha., et al., Integrating Perceptual, Device and Location Characteristics for Wireless Multimedia Transmission, 2007 22nd International Symposium on Wireless Pervasive Computing, pp. 511-514, vol. 1-2 (2007).

* cited by examiner

SYSTEM AND METHOD FOR OPTIMIZING MEDIA PLAYBACK QUALITY FOR A WIRELESS HANDHELD COMPUTING DEVICE

CROSS-REFERENCE AND PRIORITY CLAIM TO RELATED APPLICATION

This patent application claims priority under 35 U.S.C. §119(e) to U.S. Provisional Patent Application Ser. No. 61/252,621, filed on Oct. 16, 2009, entitled, "Mobile System Aware HTTP Stream Manager," the entire contents of which are hereby incorporated by reference.

DESCRIPTION OF THE RELATED ART

Today's computing environment is becoming more and more portable. People often surf the Internet with their wireless handheld computing devices with such ease similar to using mobile telephones for placing ordinary telephone calls. Typical conventional wireless handheld computing devices, include but are not limited to, devices like mobile phones, personal digital assistants ("PDAs"), "Smart" phones, pagers, navigation devices like portable GPS units, and a hand-held computer with a wireless connection or link. These wireless handheld computing devices usually fit within a person's hand or may be carried around with one hand by a person.

While these wireless handheld computing devices have made the computing environment more accessible while people are on the "go", wireless handheld computing devices have created some unique problems with respect to performance of these devices within wireless networks. Some problems relating to performance include slow download of data when wireless network bandwidth is low, and slow communications due to reception errors. This performance is often a function of the hardware and software which can be contained within the tight, electronic packaging of these handheld sized units. The performance of these handheld sized units may also be a function of the wireless network in which the wireless handheld computing device establishes a communication link.

Communication links that provide videos are desired by many users of wireless handheld computing devices. Typically, videos may take some time to download onto the wireless handheld computing device because of their file size. Sometimes the videos may be interrupted during playback because of factors which relate to the wireless network. One factor that can negatively impact the performance of a wireless handheld computing device is when the handheld computing device establishes a communication link with a wireless communications network that may be experiencing a lower bandwidth.

Another factor relating to degraded performance of handheld computing devices in wireless communication networks is latency. Latency in packet-switched networks is measured either one-way (the time from the source sending a packet to the destination receiving it), or round-trip (the one-way latency from source to destination plus the one-way latency from the destination back to the source). Higher latency in wireless communication networks generally causes videos for wireless handheld computing device to take a longer time to load compared to those networks with low or minimal latencies. Generally, most wireless handheld computing devices do not compensate for the factors which negatively impact the performance of a wireless communications network.

What is needed is a system and method that can offset or compensate for factors which negatively impact the performance wireless handheld computing devices, such as during the playback of video, when the devices are coupled to a wireless communications network.

SUMMARY OF THE DISCLOSURE

According to a first exemplary aspect, a method for optimizing media playback quality for a wireless handheld computing device is disclosed. The method includes receiving a meta-object describing one or more file segments of media and reviewing options for the one or more file segments described in the meta-object. The method further includes evaluating data from an application subsystem and data from a modem subsystem. The method also includes selecting a file segment for download that optimizes media playback on the wireless handheld computing device based on the data received from at least one of the application subsystem and modem subsystem.

A computer system for optimizing media playback for a wireless handheld computing device is disclosed. The system includes a processor operable to receive a meta-object describing one or more file segments of media and review options for the one or more file segments described in the meta-object. The processor is operable for evaluating data from an application subsystem and data from a modem subsystem. The processor selects a file segment for download that optimizes media playback on the wireless handheld computing device based on the data received from at least one of the application subsystem and modem subsystem.

A computer system for managing one or more memory resources of a wireless handheld computing device includes means for receiving a meta-object describing one or more file segments of media and means for reviewing options for the one or more file segments described in the meta-object. The system also has means for evaluating data from an application subsystem and means for evaluating data from a modem subsystem. The system also includes means for selecting a file segment for download that optimizes media playback on the wireless handheld computing device based on the data received from at least one of the application subsystem and modem subsystem.

A computer program product comprising a computer usable medium having a computer readable program code embodied therein is disclosed. The computer readable program code is adapted to execute and implement a method for optimizing media playback for a wireless handheld computing device, wherein the executed method includes receiving a meta-object describing one or more file segments of media and reviewing options for the one or more file segments described in the meta-object. The computer readable program code is further adapted to execute steps for evaluating data from an application subsystem and evaluating data from a modem subsystem. The computer readable program code further executes a step for selecting a file segment for download that optimizes media playback on the wireless handheld computing device based on the data received from at least one of the application subsystem and modem subsystem.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

In this description, the terms "communication device," "wireless device," "wireless telephone," "wireless communication device," and "wireless handset" are used interchangeably. With the advent of third generation ("3G") wireless technology, greater bandwidth availability has enabled more electronic devices with a greater variety of wireless capabilities. Therefore, a wireless device could be a cellular telephone, a pager, a PDA, a smartphone, a navigation device, or a hand-held computer with a wireless connection or link.

Figure 1A:
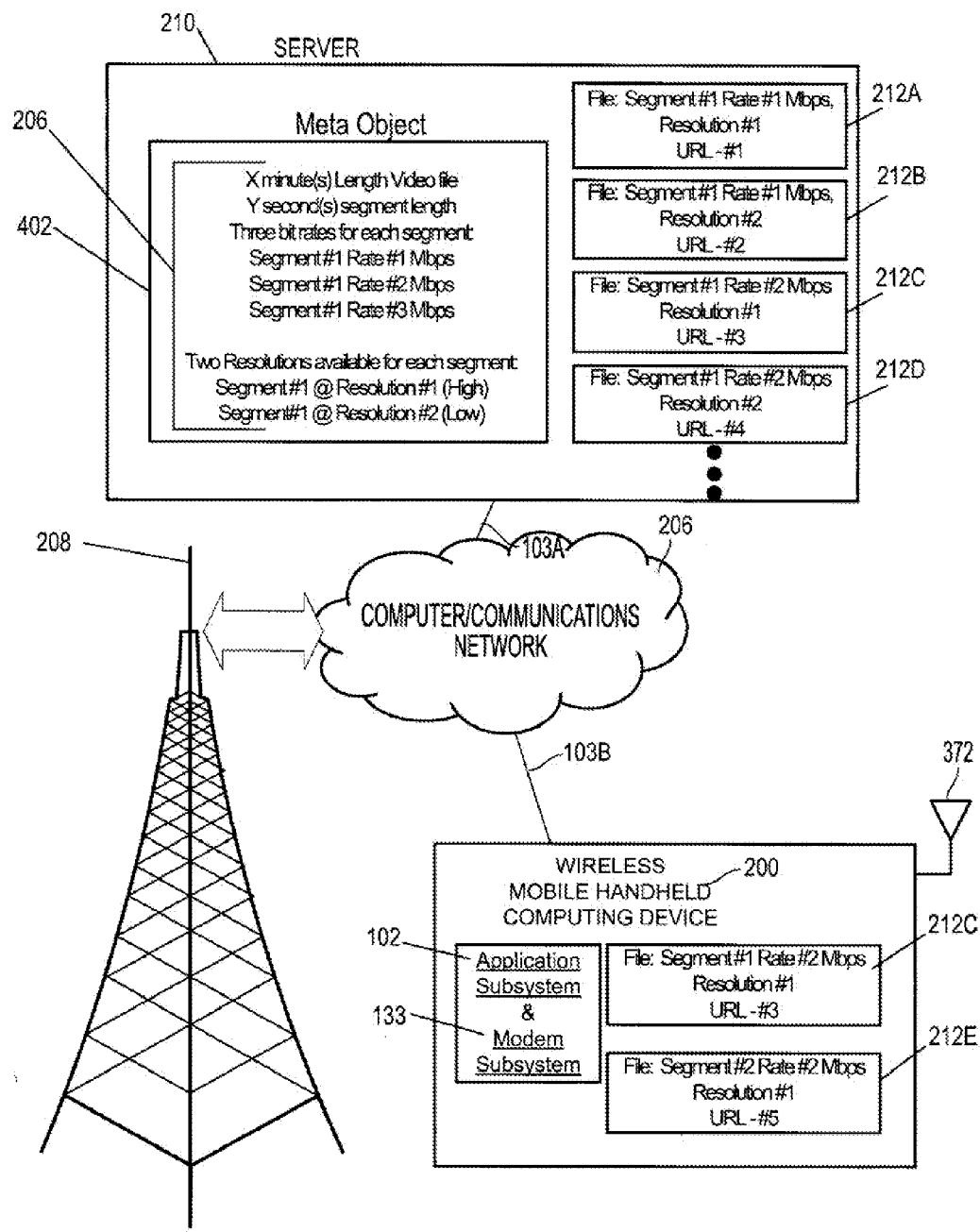
FIG. 1A is a diagram of a wireless handheld computing device coupled to a wireless communications network.

FIG. 1A is a diagram of a wireless handheld computing device 200 coupled to a wireless communications network 206. Many of the system elements illustrated in FIG. 1A are coupled via communications links 103A-B to the communications network 206. The links 103 illustrated in FIG. 1 may comprise wireless links. Wireless links include, but are not limited to, radio-frequency ("RF") links, infrared links, acoustic links, and other wireless mediums.

The communications network 206 may comprise a wide area network ("WAN"), a local area network ("LAN"), wireless LANs ("wLANs"), the Internet, a Public Switched Telephony Network ("PSTN"), a paging network, or a combination thereof. The communications network 206 may be established by broadcast RF transceiver towers 208. However, one of ordinary skill in the art recognizes that other types of communication devices besides broadcast RF transceiver towers 208 are included within the scope of the invention for establishing the communications network 206.

The server 210 may have meta-objects 402 and video file segments 212 that may be downloaded and stored in memory by the wireless handheld computing device 200. The handheld computing device 200 is shown to have an antenna 372 so that a respective handheld device 200 may establish wireless communication links 103 with the communications network 206.

The server 210 may communicate with the wireless handheld computing device 200 across the communications network 206 in order to share its meta-objects 402 and file segments 212 with the handheld computing device 200. The meta-objects and file segments 212 are processed and managed by the application subsystem 102 and modem subsystem 133 of the handheld computing device 200.

Each meta-object 402 may comprise a file, such as file having an extendible mark-up language (XML) format, which has detailed file information 206 about video files 212 that may be downloaded by the wireless handheld computing device 200. While only video file segments 212 have been illustrated, one of ordinary skill in the art recognizes that any type of media file is within the scope of the invention. That is, a media file may include, but is not limited to, video files, audio files, large image files, and any combination thereof.

The detailed file information 206 of the meta-object 402 may describe various properties of video file segments 212A-D which may be downloaded by the wireless handheld computing device 200. Exemplary properties include, but are not limited to, the total length of a video that comprises a plurality of file segments 212, the discrete length of each file segment 212, different bit rates for similar segments 212, and different video resolutions for similar segments 212. Other properties for the video not mentioned here and describing various aspects/features of video are included within the scope of the invention as is understood to one of ordinary skill in the art. Further, the invention is not limited to video files and may be appropriate for other types of files such as image files, voice files, text files, and any other type of file comprising data which has a size that generally requires a file to be broken into different segments.

While only four file segments 212A-D have been illustrated, a greater number or a fewer number of file segments 212 are within the scope of the invention as is understood to one of ordinary skill in the art. Further, fewer or greater duplicate file segments 212 having different bit rates but with similar resolutions, as well as fewer or greater duplicate file segments 212 having similar bit rates with similar resolutions, and fewer or greater duplicate file segments 212 having different bit rates and different resolutions are within the scope of the invention as understood to one of ordinary skill the art.

The first file segment to 212A has a first bit rate at a first video resolution and is provided with a first universal resource locator ("URL") that may be selected by the wireless handheld computing device 200. The second file segment 212B has a first bit rate similar to the first file segment 212A but it has a second video resolution which is different from the first resolution of the first file segment 212A. The second file segment to 212B has a second URL which is different from the first URL of the first file segment 212A.

The third file segment 212C has a second bit rate which is different from the first bit rates of the first and second file segments 212A-212B. The third file segment to 212C has a first video resolution which is identical to the video resolution of the first and second file segments 212A-212B. The third file segment 212C has a third URL which is different from the first URL of the first file segment 212A and second URL of the second file segment 212B.

The fourth file segment 212D has a second bit rate equal to the second bit rate of the third file segment 212C but has a second video resolution which is the same as the second video resolution of the second file segment 212B. The fourth file segment 212C has a fourth URL which is different from the first URL of the first file segment 212A, the second URL of the second file segment 212B, and the third URL of the third file segment 212C. One of ordinary skill in the art recognizes that fewer or a greater number of file segments 212 may be provided without departing from the scope of the invention. Further details about the meta-object 402 and the file segments 212 will be described below in connection with FIGS. 5A-5B and FIG. 8.

Figure 1B:
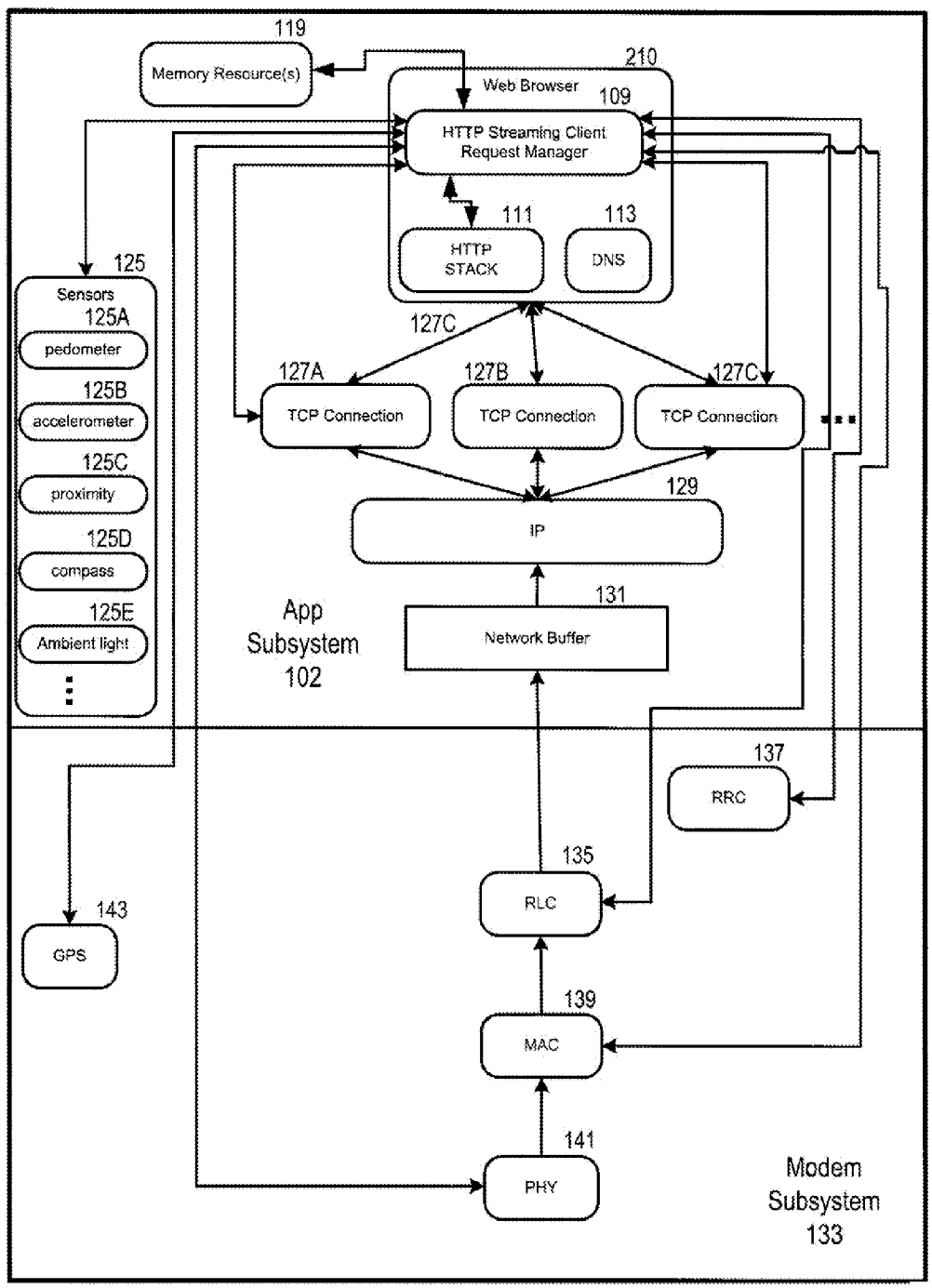
FIG. 1B is a diagram of one aspect of a software architecture for a system that optimizes video playback on the wireless, handheld computing device of FIG. 2.

FIG. 1B is a diagram of a first aspect of a software architecture for a system 102 that optimizes video playback for a wireless handheld computing device 200. The application subsystem 102 may comprise a mobile web browser application 105 that is executed by a central processing unit 324 (see FIG. 2) and which can run video supported by the hypertext transfer protocol ("HTTP") streaming request manager 109.

The mobile web browser application or module 105 may communicate with transfer communication protocol ("TCP") modules 127 that reside over an Internet protocol ("IP") layer 129 as understood to one of ordinary skill in the art and described below.

The IP layer 129 communicates with a network buffer layer 131 as understood by one of ordinary skill the art. The IP layer 129 communicates with the modem subsystem 133, which is executed by a second central processing unit 326 (see FIG. 2).

The mobile web browser module 105 includes a hypertext transfer protocol ("HTTP") streaming request manager 109, a HTTP stack 111, and a domain name server module 113. While illustrated as included within the web browser module 105, in a further alternative exemplary embodiment (not illustrated), the HTTP streaming request manager 109 may reside as a separate module relative to web browser 105.

HTTP streaming protocol is a mechanism for sending data from a server 210 to a web browser on a handheld computing device 200 in response to an event. HTTP streaming protocol may be achieved through several common mechanisms. In one such mechanism, the server 210 does not terminate the response to the computing device 200, also referred to as the client, after data has been served. This differs from the typical HTTP cycle in which the response is closed immediately following data transmission. The server 210 leaves the response open such that if an event is received, it can immediately be sent to the client. Otherwise the data would have to be queued until the client's next request is made to the server 210. Typical uses for HTTP streaming protocol include, but are not limited to, video playback, market data distribution (stock tickers), live chat/messaging systems, online betting and gaming, sport results, monitoring consoles and sensor network monitoring. The HTTP streaming protocol typically uses port 80 or port 8080.

The mobile web browser module 105 may be coupled to a memory resource 119. The memory resource 119 may include, but is not limited to, a cache, random access memory ("RAM"), flash memory, a Secure Digital ("SD") memory card, and any combination thereof.

The request manager 109 may be responsible for controlling or instructing the web browser 105 on what file segments 212 should be downloaded next to the handheld mobile computing device 200 to insure optimal video playback quality for the computing device 200. The request manager 109 may be dynamic in that it may continually monitor elements of the application subsystem 102 as well as the modem subsystem 133. Further, the request manager 109 may also receive messages from elements within the application subsystem 102 and the modem subsystem 133.

The DNS module 113 of the web browser 105 may be responsible for translating the text based domain names into the numeric Internet protocol (IP) address as understood by one of ordinary skill the art. The DNS module 113 may communicate the IP address back to the HTTP stack 111 which in turn relays it to the TCP connection module 127.

When the HTTP stack 111 returns a meta-object 402 from the TCP connection module 127, the HTTP stack module 111 relays this meta-object 402 to the streaming client request manager 109. The http stack module 111 may also provide the client request manager 109 with certain status information. The status information may include, but is not limited to: high speed-schedule control channel ("HS-SCCH") Valid status; high speed transport block size ("HS-TBS"); layer one block error rates ("L1 BLER"); radio link control protocol data unit ("RLC PDU") size; radio link control down link service data unit ("RLC DL SDU") Byte received ("Rx"); high speed downlink packet access ("HSDPA") user equipment ("UE") Category; media access control uplink buffer status report ("MAC UL BSR"); enhanced uplink transmission time interval ("EUL TTI"); enhanced transport format combination index ("ETFCI") table index; ETCFI; the number of new transmissions ("Tx"); radio link control uplink service data unit ("RLC UL SDU") Byte transmission ("Tx"); diversity transmission/diversity reception ("DTX/DRX") mode; enhanced uplink user equipment ("EUL UE") category; media access control transmission layer transport block size ("MAC TL TBS"); packet data convergence protocol downlink service data unit ("PDCP DL SDU") Byte reception ("Rx"); media access control uplink transport block size ("MAC UL TBS"); packet data convergence protocol uplink service data unit ("PDCP UL SDU") Byte transmission ("Tx"); and user equipment category ("UE Category").

The request manager 109 is responsible for parsing and/or reviewing the meta-object 402 and deciding which video segments 212 are appropriate for the next download after assessing the current wireless network conditions and the operating environment of the handheld computing device 200.

The Transport Control Protocol ("TCP") connection module 127 operates in the Transport Layer of the Open Systems Interconnection ("OSI") model of general networking as understood by one of ordinary skill in the art. The TCP connection module 127 is responsible for encapsulating application data blocks into data units (datagrams, segments) suitable for transfer to the network infrastructure for transmission to the destination host, or managing the reverse transaction by abstracting network datagrams and delivering their payload to the mobile web browser 105.

The TCP connection modules 127 may provide information that includes, but is not limited to, re-transmission time out ("RTO"); advertised receiver window ("Rx Window"); transmission-receiver throughput ("Tx/Rx Throughput"); packet statistics; a total number of TCP connections; estimated round-trip time ("RTT"); number of bytes received; the number of in sequence packets; and the TCP transmitting window size.

The Internet Protocol ("IP") module 129 communicates with the TCP connection module 127 and the network buffer layer 131. The IP module 129 has the task of delivering distinguished protocol datagrams (packets) from the mobile web browser to the server 210 based on their addresses. The IP module 129 defines addressing methods and structures for datagram encapsulation. The IP module 129 may utilize Internet Protocol Version 4 ("IPv4") as well as Internet Protocol Version 6 ("IPv6"), which is being deployed actively as of this writing. However, other versions of the Internet protocol, including future ones not yet developed, are included within the scope of the invention.

The network buffer layer 131 communicates with the IP module 129 and the modem subsystem 133. The network buffer layer 131 may contain all hardware specific interface methods, such as Ethernet and other IEEE 802 encapsulation schemes. The network buffer layer 131 may probe the topology of a local network, such as the communications network 206. It may discover routers and neighboring hosts, and it may be responsible for discovery of other nodes on the link. The network buffer layer 131 may determine the link layer addresses of other nodes, find available routers, and maintaining reachability information about the paths to other active neighbor nodes.

The streaming client request manager 109 may communicate with the http stack 111 as well as the TCP modules 127. The streaming request manager 109 also communicates with one or more sensors 125. The sensors 125 may include, but are not limited to, pedometer 125A, an accelerometer 125B, a proximity sensor 125C, a compass 125D, and an ambient light sensor 125E. The pedometer 125A may provide signals that indicate that the handheld computing device 200 is being used by a person who is walking.

The accelerometer 125B may provide signals that indicate that the handheld computing device 200 is located in a motorized vehicle, such as an automobile. The proximity sensor 125C may indicate if the handheld computing device 200 is positioned next to a person's face for conducting a telephone call. The compass 125D may provide signals that indicate a specific direction in which the handheld computing device 200 is traveling. And the ambient light sensor 125E may provide signals to indicate if the handheld computing device 200 is being used in a light or dark environment, which impacts how videos may need to be displayed on the computing device 200.

Figure 2:
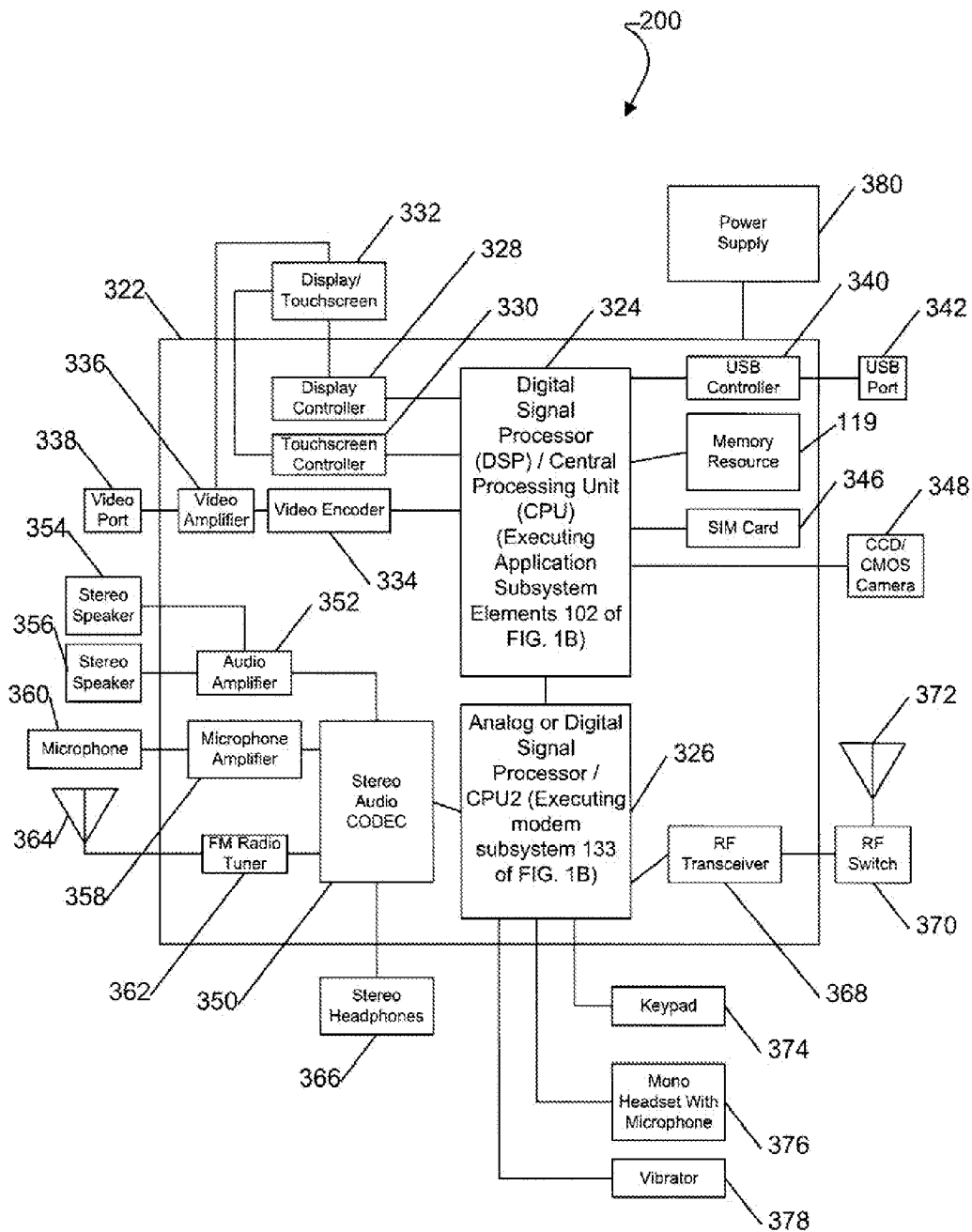
FIG. 2 is a diagram of an exemplary wireless handheld computing device that comprises a mobile telephone.

The modem subsystem 133 may comprise a radio link control ("RLC") layer 135, a media access control ("MAC") layer 139, a physical ("PHY") layer 141, a radio-relay control ("RRC") module 137, and a global positioning system ("GPS") 143. These elements of the modem subsystem 133 may be responsible for communicating with communications hardware such as the RF transceiver 368 as illustrated in FIG. 2.

Each of the elements of the modem subsystem 133 may send messages or receive queries from the http streaming client request manager 109. For example, the RRC module 137 may communicate information such as, but not limited to, high speed downlink packet access ("HSDPA") category information, enhanced uplink layer ("EUL") category information, and discontinuous reception/transmission ("DRX/DTX") configuration ("Config") information.

The RLC module 135 may communicate throughput as well as radio link control ("RCL") protocol data unit ("PDU") size. The MAC layer 139 may communicate uplink ("UL") information, such as, but not limited to, buffer status report ("BSR") information and enhanced dedicated channel ("EDCH") transport format ("TF") information. The physical layer 141 may communicate the downlink ("DL") information, such as, but not limited to, high speed transport block size ("HS-TBS"), modulation, channel quality indication ("CQI"), block error rate ("BLER") measurement, multi-input/multi-output ("MIMO"), receiver ("Rx") automatic gain control ("AGC"), as well as equalizer integrated circuit ("EQ/IC") receiver ("Rx") diversity ("D"). The physical layer 141 may also communicate uplink ("UL") information, such as, but not limited to, BLER, modulation, and transmitter ("Tx") automatic gain control ("AGC").

The RRC module 137, RLC module 135, MAC module 139, and PHY module 141, may form an evolved high-speed packet access system ("HSPA") as is understood to one of ordinary skill the art. Meanwhile, the GPS module 143 may provide information, such as, but not limited to, location, and speed or velocity of the handheld mobile computing device 200 to the streaming request manager 109.

By monitoring elements of the application subsystem 102 and the modem subsystem 133, the streaming client request manager 109 may allow the wireless handheld computing device 200 to intelligently vary a video quality being displayed on the device 200 by monitoring wireless network conditions as well as conditions of the handheld computing device 200 itself. Video quality may be varied by the streaming client request manager 109 by using the monitored conditions to determine what is the appropriate bit rate for a video segment file 212 to be downloaded from the server 210.

Some of the monitored conditions based upon the data provided by the application subsystem 102 and the modem subsystem 133 include, but are not limited to: media player buffer conditions, including the size of the current buffer and the rate at which the buffer's growing are being consumed by the computing device 200; current and historical WWAN bandwidth; current and historical WWAN signal strength; number of IP socket data connections available; estimation of an overall video clip length and then estimating each uniform resource locator ("URL") download time for each file segment 212 based on signal-noise-ratio history/histogram and location based service ("LBS"); rate of speed of the handheld computing device 200 which is calculated by either cell tower identification triangulation or precise latitude longitude through the use of location-based technologies such as the GPS module 143; and the direction of travel of the handheld computing device 200 using an accelerometer and/or the LBS.

The streaming client request manager 109 may calculate a predetermined time period in which the client request manager 109 must maintain or use a lower bit rate until the signal-to-noise ratio stays high and/or the BLER stays low continuously. The streaming client request manager 109 may also turn "on" or turn "off" any type of receive diversity function(s) in the modem subsystem 133 in order to minimize power during ideal network situations, such as when the handheld computing device 200 is stationary, or when the handheld computing device 200 is operating under relatively low-speed conditions, such as when a user is walking with the computing device 200.

Referring to FIG. 2, this figure is a diagram of an exemplary, non-limiting aspect of a wireless handheld computing device 200 comprising a wireless telephone which corresponds with the wireless handheld computing device of FIG. 1. As shown, the wireless handheld computing device 102 includes an on-chip system 322 that includes a digital signal processor and/or a first central processing unit 324 AND an analog signal processor and/or second central processing unit 326 that are coupled together. Further, the first processor 324 and the memory resources 119 may serve as a means for executing one or more of the method steps described in this disclosure in connection with FIGS. 5-8. Meanwhile, the second digital signal processor/central processing unit 326 may also execute one or more instructions relating to the modem subsystem 133, which are also described in connection with FIGS. 5-8.

While a wireless handheld computing device 200 is illustrated, one of ordinary skill in the art recognizes that the invention may be practiced with any type of wireless computing device irrespective of the size of the computing device. That is, other wireless computing devices beyond handheld units, such as notebook computers, laptop computers, and desktop computers, are included within the scope of the invention.

As illustrated in FIG. 2, a display controller 328 and a touchscreen controller 330 are coupled to the digital signal processor 324. A touchscreen display 332 external to the on-chip system 322 is coupled to the display controller 328 and the touchscreen controller 330.

FIG. 2 further indicates that a video encoder 334, e.g., a phase-alternating line ("PAL") encoder, a sequential couleur avec memoire ("SECAM") encoder, a national television system(s) committee ("NTSC") encoder or any other video encoder, is coupled to the digital signal processor 324. As noted previously, the first digital signal processor 324 and/or second digital signal processor 326 may be substituted with a Central Processor Unit ("CPU") as understood to one of ordinary skill in the art. Either hardware unit may execute the subsystem of software elements/instructions of FIGS. 5A-8.

A video amplifier 336 is coupled to the video encoder 334 and the touchscreen display 332. A video port 338 is coupled to the video amplifier 336. As depicted in FIG. 2, a universal serial bus ("USB") controller 340 is coupled to the digital signal processor 324. Also, a USB port 342 is coupled to the USB controller 340. The memory resources 119 and a subscriber identity module ("SIM") card 346 may also be coupled to the digital signal processor 324. Further, as shown in FIG. 2, a digital camera 348 may be coupled to the digital signal processor 324. In an exemplary aspect, the digital camera 348 is a charge-coupled device ("CCD") camera or a complementary metal-oxide semiconductor ("CMOS") camera.

As further illustrated in FIG. 2, a stereo audio CODEC 350 may be coupled to the analog signal processor 326. Moreover, an audio amplifier 352 may be coupled to the stereo audio CODEC 350. In an exemplary aspect, a first stereo speaker 354 and a second stereo speaker 356 are coupled to the audio amplifier 352. FIG. 2 shows that a microphone amplifier 358 may be also coupled to the stereo audio CODEC 350. Additionally, a microphone 360 may be coupled to the microphone amplifier 358. In a particular aspect, a frequency modulation ("FM") radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 2 further indicates that a radio frequency ("RF") transceiver 368 may be coupled to the analog signal processor 326. An RF switch 370 may be coupled to the RF transceiver 368 and an RF antenna 372. The RF transceiver 368 may communicate with conventional communications networks as well as with global positioning system ("GPS") satellites in order to obtain GPS signals for geographical coordinates. The RF transceiver may be controlled and monitored by the GPS module 143 of FIG. 1B.

As shown in FIG. 2, a keypad 374 may be coupled to the analog signal processor 326. Also, a mono headset with a microphone 376 may be coupled to the analog signal processor 326. Further, a vibrator device 378 may be coupled to the analog signal processor 326. FIG. 2 also shows that a power supply 380 may be coupled to the on-chip system 322. In a particular aspect, the power supply 380 is a direct current ("DC") power supply that provides power to the various components of the wireless handheld computing device 102 that require power. Further, in a particular aspect, the power supply is a rechargeable DC battery or a DC power supply that is derived from an alternating current ("AC") to DC transformer that is connected to an AC power source.

As depicted in FIG. 2, the touchscreen display 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

Figure 3:
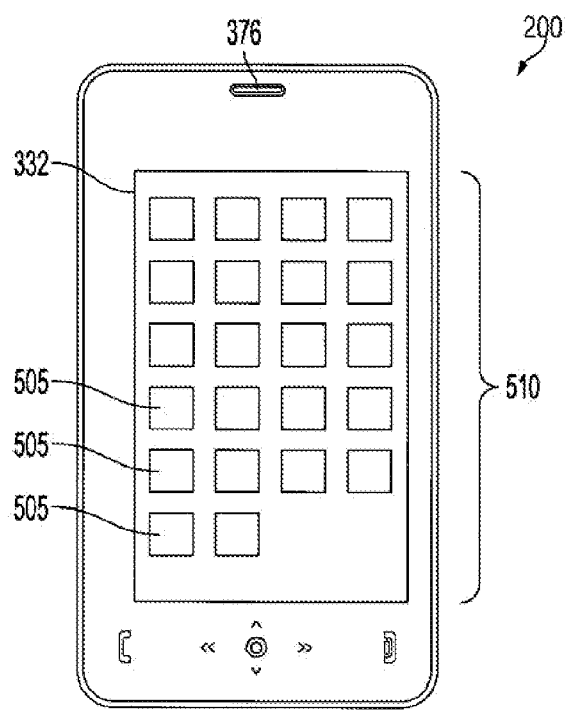
FIG. 3 is a diagram of a touch screen for a wireless handheld computing device.

FIG. 3 is a diagram of a touch screen display 332 for a wireless handheld computing device 200. As shown, the wireless handheld computing device 200 may include a menu or listing 510 of program icons 505, represented as square boxes in this exemplary embodiment. The wireless handheld computing device 200 also includes a headset or speaker 376 that may be positioned next to a user's ear for listening to a mobile phone conversation.

Figure 4:
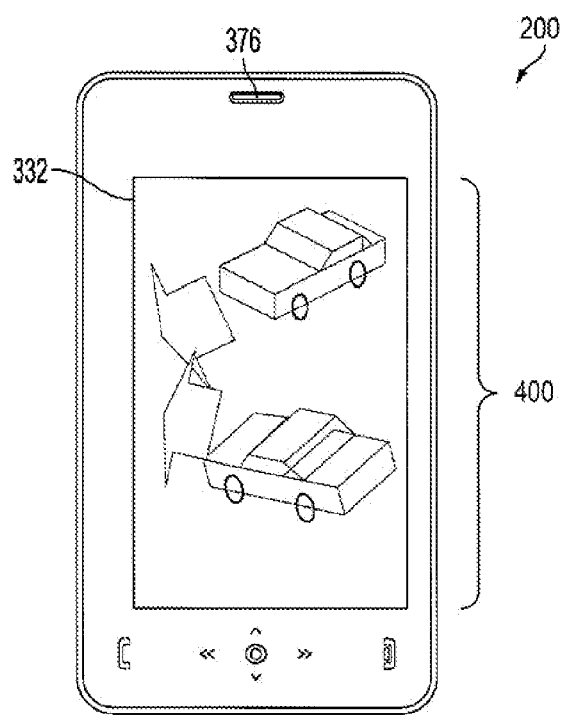
FIG. 4 is a diagram of a screen presenting the content of a video downloaded by a wireless handheld computing device.

FIG. 4 is a diagram of a screen 332 presenting the content of video 400 downloaded by a wireless handheld computing device 200. The video 400 may comprise moving images. In the exemplary embodiment illustrated in FIG. 4, two automobiles are illustrated as moving towards each other in directions corresponding with two arrows. One of ordinary skill in the art recognizes that invention is not limited to the exemplary automobile images illustrated in FIG. 4 and that other types of moving images for different videos are within the scope of the invention.

Figure 5A:
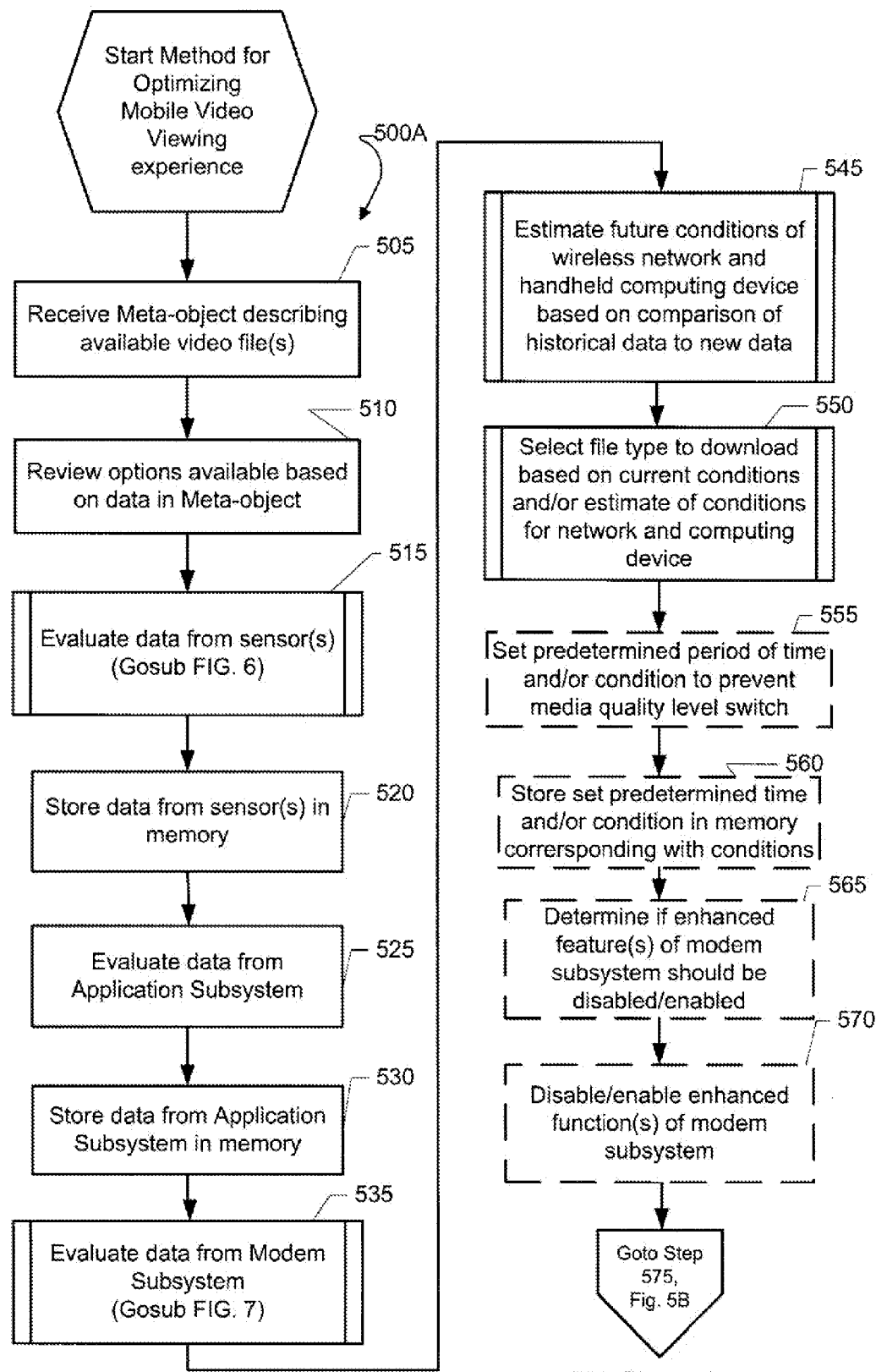
FIG. 5A is a flowchart illustrating a method for optimizing video playback for a wireless handheld computing device.

Referring to FIG. 5A, this figure is a flowchart illustrating a method 500A for optimizing video playback for a wireless handheld computing device 200. Block 505 is the first step in the process 500 in which the meta-object 402 describing the available video file segments 212 on the server 210 is received by the wireless handheld computing device 200. As noted previously, the meta-object 402 may comprise a file, such as file having an extendible mark-up language (XML) format, which has detailed file information 206 about video files 212 that may be downloaded by the wireless handheld computing device 200.

This detailed file information 206 in meta-object 402 may describe various properties of video file segments 212A-D which may be downloaded by the wireless handheld computing device 200. Exemplary properties include, but are not limited to, the total length of a video that comprises a plurality of file segments 212, the discrete length of each file segment 212, different bit rates for similar segments 212, and different video resolutions for similar segments 212. Other properties for the video not mentioned here and describing various aspects/features of video are included within the scope of the invention as is understood to one of ordinary skill in the art. Further, the invention is not limited to video files and may be appropriate for other types of files such as image files, voice files, text files, and any other type of file comprising data which has a size that generally requires a file to be broken into different segments.

In the exemplary embodiment illustrated in FIG. 1A, the meta-object 402 describes a video having a length of X minutes which is broken into file segments 212 having a length of Y seconds. The meta-object 402 describes that three bit rates have been provided for each file segment 212. The meta-object 402 also describes that two resolutions are available for each file segment 212. One resolution is denoted as being "High" resolution while the other file segment 212 is denoted as being "Low" resolution.

Next, in block 510, the http streaming client request manager 109 may review the options for the file segments 212 that are listed in the meta-object 402. The client request manager 109 may store these options in one or more memory resources 119.

In routine block 515, the client request manager 109 may evaluate the data it receives from the sensors 125 as illustrated in FIG. 1B. As noted previously, the client request manager 109 may actively request or "ping" the sensors 125 for data or the sensors 125 may provide status updates to the client request manager 109 when conditions change. Further details of routine block 515 will be described in connection with FIG. 6 described in further detail below.

Next, in block 520, the client request manager 109 may store the data from the sensors 125 in one or more memory resources 119. In block 525, the client request manager 109 may evaluate data from the application subsystem 102.

Specifically, in block 525, the client request manager 109 may evaluate the data provided by the TCP connection modules 127 and the HTTP stack 111. As noted previously, the TCP connection modules 127 may provide information that includes, but is not limited to, re-transmission time out ("RTO"); advertised receiver window ("Rx Window") that allows for the client request manager 109 to estimate and achievable maximum throughput as understood by one of ordinary skill in the art; transmission-receiver throughput ("Tx/Rx Throughput"); packet statistics; a total number of TCP connections; estimated round-trip time ("RTT") so that the RTT for different host names may be estimated as understood by one of ordinary skill in the art; number of bytes received so that the client request manager 109 can compute the average serving throughput as understood by one of ordinary skill in the art; the number of in sequence packets so that the client request manager 109 can estimate the TCP transmitting window size as understood by one of ordinary skill in the art; and the TCP transmitting window size so that the client request manager 109 the estimate the achievable maximum throughput as understood by one of ordinary skill in the art.

The HTTP stack module 111 may provide the client request manager 109 with status information that may include, but is not limited to: high speed-schedule control channel ("HS-SCCH") Valid status which allows the client request manager 109 to estimate how often the handheld computing device 200 is scheduled by the network for transmission and it is a value that allows the client request manager 109 to estimate the maximum achievable throughput as understood by one of ordinary skill in the art; high speed transport block size ("HS-TBS") and layer one block error rates ("L1 BLER") which allow the client request manager 109 to estimate the average and maximum achievable throughput as understood by one of ordinary skill in the art; radio link control protocol data unit ("RLC PDU") size which allows the client request manager 109 to estimate the achievable maximum throughput as understood by one of ordinary skill in the art; radio link control down link service data unit ("RLC DL SDU") Byte received ("Rx") which allows the client request manager 109 to compute the average throughput to the Internet protocol ("IP") layer as understood by one of ordinary skill in the art.

The HTTP stack module 111 may further provide the client request manager 109 with other status information, such as, but not limited to: high speed downlink packet access ("HS-DPA") user equipment ("UE") Category which allows the client request manager 109 to calculate the theoretical maximum downlink throughput as understood by one of ordinary skill in the art; media access control uplink buffer status report ("MAC UL BSR") which indicates how much data is buffered to the protocol stack waiting for uplink transmission scheduling as understood by one of ordinary skill in the art; enhanced uplink transmission time interval ("EUL TTI"); enhanced transport format combination index ("ETFCI") table index; ETFCI; the number of new transmissions ("Tx"); radio link control uplink service data unit ("RLC UL SDU") Byte transmission ("Tx") which allows the client request manager 109 to compute the average throughput seen by the IP layer as understood by one of ordinary skill in the art; diversity transmission/diversity reception ("DTX/DRX") mode which allows the client request manager 109 to configure this mode so that HTTP requests may be bundled that may decrease latency as understood by one of ordinary skill in the art; enhanced uplink user equipment ("EUL UE") category which allows the client request manager 109 to calculate a theoretical maximum uplink throughput as understood by one of ordinary skill in the art; media access control transmission layer transport block size ("MAC TL TBS") which allows the client request manager 109 to calculate the average throughput as understood by one of ordinary skill in the art; packet data convergence protocol downlink service data unit ("PDCP DL SDU") Byte reception ("Rx") which allows the client request manager 109 to compute the average throughput to the IP layer as understood by one of ordinary skill in the art; media access control uplink transport block size ("MAC UL TBS") which allows the client request manager 109 to compute the average throughput as understood by one of ordinary skill in the art; packet data convergence protocol uplink service data unit ("PDCP UL SDU") Byte transmission ("Tx") which allows the client request manager 109 to compute the average throughput as seen by the IP layer as understood by one of ordinary skill in the art; and user equipment ("UE Category") which allows the client request manager 109 to compute the theoretical maximum throughput as understood by one of ordinary skill in the art.

With the EUL TTI, ETFCI table index, ETFCI, and the number of new Tx parameters provided by the HTTP stack 111, the client request manager 109 may estimate the average and maximum achievable throughput as understood by one of ordinary skill the art. In block 530, the client request manager 109 may store the data from the application subsystem 102 in one or more of the memory resources 119. In routine block 535, the client request manager 109 may evaluate data from the modem subsystem 133. Details of routine block 535 will be described in further detail below in connection with FIG. 7.

In routine block 545, the http streaming client request manager 109 may estimate future conditions of the wireless network 206 based on a comparison of historical data to the new data that has been retrieved from the application subsystem 102 and the modem subsystem 133. For example, based on the data that the client request manager 109 receives from the sensors 125, the client request manager 109 may determine if the handheld computing device 200 is moving and how fast it may be moving. This allows the streaming client request manager 109 to estimate what type of radio conditions may be expected in the near future for the handheld computing device 200.

The client request manager 109 may make certain adjustments to the operation of the handheld computing device 200 when it has determined that the handheld computing device 200 is in a motor vehicle, such as an automobile, which will likely pass through many different wireless networks 206 while it is moving. This may allow the client request manager 109 to determine how long the handheld computing device 200 may be within the reception range of a particular wireless network 206 and specifically a cellular base station transceiver tower 208.

As another example, in block 545, the http streaming client request manager 109 may determine that the handheld computing device 200 is being carried by a human who is walking. If this condition is detected, then the client request manager 109 will determine that the handheld computing device 200 will be within a particular wireless network 206, and specifically within range of a cellular base station transceiver tower 208, for a certain period of time which is typically greater than the period of time compared to when the handheld computing device 200 would have been if the handheld computing device 200 was in a motorized vehicle, such as an automobile.

The calculation of time by the client request manager 109 in block 545 of how long the handheld computing device 200 will be within range of a particular wireless network 206 allows the client manager 109 to anticipate when a handoff will likely occur from one cellular base station transceiver tower 208 to another transceiver tower to 208. Alternatively, or in addition to this time calculation, the streaming client request manager 109 may query hardware or software elements within the modem subsystem 133 that may track data indicating when a cell site handoff is about to occur.

It is not critical that the client request manager 109 calculate exactly when a handoff is about to occur but rather it is helpful for the client request manager 109 to determine when the handheld computing device 109 will be experiencing rapid changes with respect to the wireless networks 206 in which the handheld computing device 200 is able to establish to communications.

Next, in routine block 550, the client request manager 109 may select a file segment type to download from the server 210 based on current network conditions and current conditions of the handheld computing device 109 and/or based on the estimate of network conditions calculated in routine block 545. In this routine block 550, the client request manager 109 may specify which file segment 212 that it wishes to download from the server 210 in order to optimize playback of the video 400 that is being displayed on the handheld computing device 200. The streaming client request manager 109 in some situations may constantly request a low-quality video streaming signal, such as the fourth file segment to 212 D, which has a lower bit rate and lower resolution compared to the third file segment 212C.

The streaming client request manager 109 may typically request low-quality video streaming signals if the manager 109 has determined that it is likely that the handheld device 109 will experience rapid changes with respect to the wireless networks 206 and possibly lose communications with the wireless networks 206. If the client request manager 109 determines that the handheld computing device 200 will likely be stationary, then the client request manager 109 may ask for high-quality signals or a combination of low quality and high quality depending upon the conditions detected by the client request manager 109. For example, if the client request manager 109 detects that the handheld computing device 200 will be stationary, then the client request manager 109 may request a high-quality signal that comprises the first file segment 212A of FIG. 1A having the first and highest bit rate and highest video resolution. The client request manager 109 may build a buffer of data, such as for streaming video, so that the handheld computing device 200 may keep advanced segments 212 of a video stream that is not being viewed by a user in memory resources 119.

As another example of steps that may be performed by the client request manager 109 in routine block 550, the client request manager 109 may shut down the display screen 332 when the proximity sensor 125C determines that the handheld computing device 200 is being positioned proximate to an ear of a user so that a telephone conversation may be established. In such a scenario, the display screen 232 of the handheld computing device may be activated or powered off since it is unlikely that a user is using the video aspects of the handheld computing device 200 when the handheld computing device 200 is positioned adjacent to a user's ear. Alternatively, the client request manager 109 may also request low-quality video in such a scenario since it is unlikely that the video is being monitored or viewed closely by the user.

A further example of the steps that may be performed by the client request manager 109 in routine block 550 include the client request manager 109 selecting a file segment 212 based on data that it has received from the ambient light sensor 125E. If the ambient light sensor 125E indicates that the handheld computing device 200 is being exposed to a significant amount of light that may deteriorate the ability to view a video, then the client request manager 109 may request low-quality video in this scenario. If the ambient light sensor 125E indicates that the handheld computing device 200 is being exposed to an environment in which light is not present, then the client request manager 109 may request higher quality video in this scenario since the video quality will be easily perceived by a user.

Next, in optional block 555 which has been illustrated with broken lines, the client request manager 109 may set a predetermined period of time and/or a condition to prevent a switch to a different level of video quality. In optional block 555, the client request manager 109 calculates an amount of time that it believes the current network conditions will remain the same, usually in situations in which the network conditions are poor for establishing communications between the handheld computing device 200 and a broadcast transceiver tower 208. This calculation of time is based upon the estimate of network conditions that the client request manager 109 calculated in block 545.

Optional block 555 is usually practiced or executed by the streaming client request manager 109 after the client request manager 109 has determined in block 545 that the signal-to-noise ratio ("SNR") tracked by the PHY layer module 141 has reached a predetermined level. In optional block 555, the streaming client request manager 109 may prevent a change to a higher video quality segment 212 unless the SNR stays at a predetermined level for a predetermined period of time while the block error rate ("BLER") stays at a predetermined level continuously for a predetermined period of time.

In optional block 560, the client request manager 109 may store the predetermined period of time calculated in optional block 555 and/or the condition calculated in optional block 555 in one or more memory resources 119 that are associated with the current conditions for historical tracking purposes. Next, in optional block 565, the client request manager 109 may determine if enhanced features of the modem subsystem 133 should be disabled or activated.

In this optional block 565, the client request manager 109 may determine if advanced receiver functions, such as the receiver diversity ("RxDiv") function, based on the GPS data from the GPS module 143 and power level conditions monitored by the client request manager 109. If the client request manager 109 determines that the handheld computing device 200 is experiencing a low power condition and is moving rapidly between wireless networks 206 based on GPS data, then the client request manager 109 may decide to disable one or more advanced receiver functions in order to conserve power and to maintain communications with the wireless network 206. If the client request manager 109 determines that the handheld computing device 200 is experiencing a normal power condition meaning that the handheld computing device 200 is fully charged and if the handheld computing device 200 is stationary, then the client request manager 109 may decide to enable or activate one or more of the advanced receiver functions from their disabled state.

In optional block 570, the client request manager 109 enables or disables the advanced receiver functions based on its decisions determined in optional block 565. Other advanced receiver functions which may be disabled or enabled by the client request manager include, but are not limited to: equalizer enable ("EQ Enable"); and interference cancellation enable ("IC Enable"). The process then continues to decision block 575 of FIG. 5B.

Figure 5B:
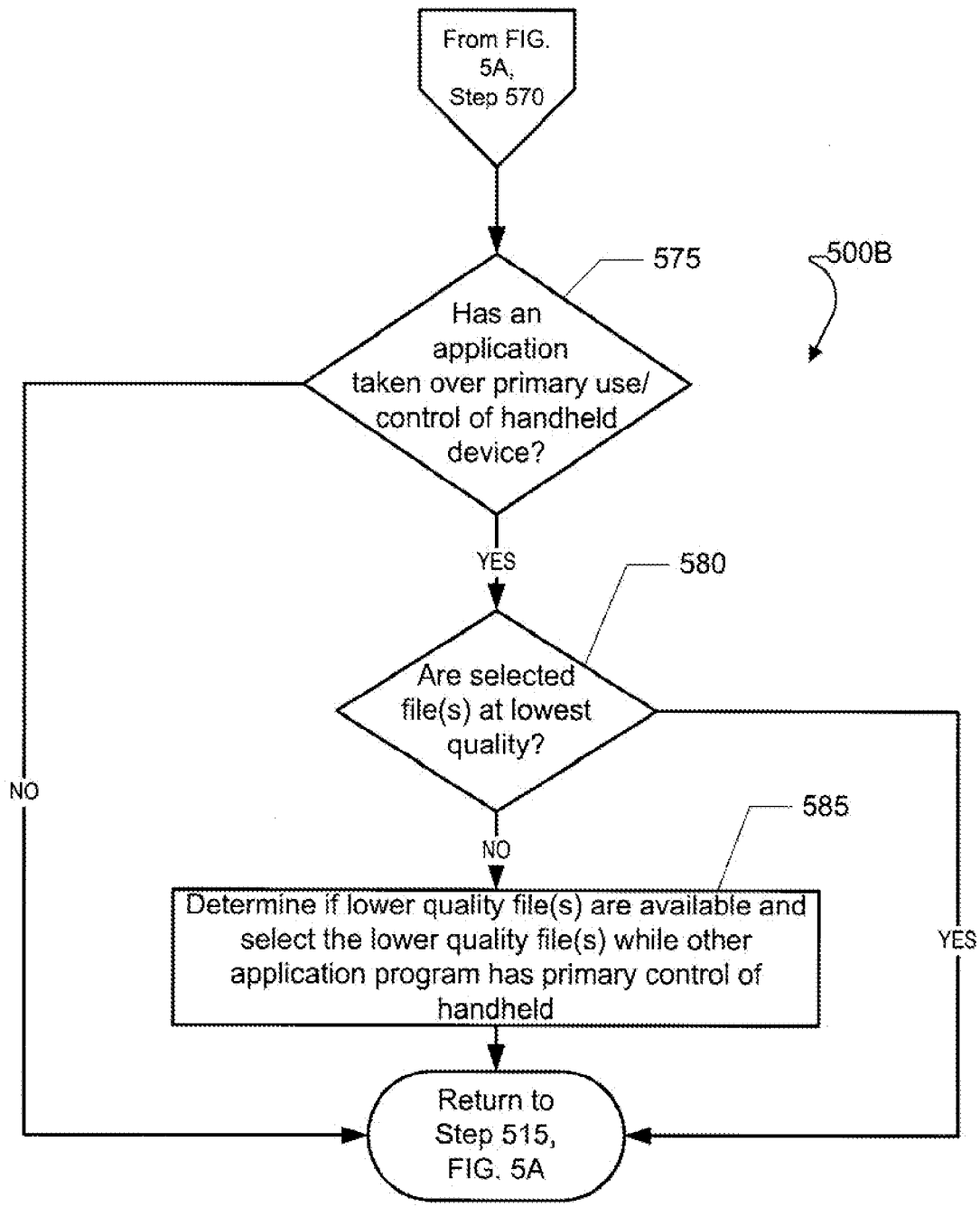
FIG. 5B is a continuation flowchart of the flowchart of FIG. 5A illustrating the method for optimizing video playback for a wireless handheld computing device.

FIG. 5B is a continuation flowchart of the flowchart of FIG. 5A illustrating the method 500 for optimizing video playback for a wireless handheld computing device 200. Decision block 575 is the first block of this flowchart in which the client request manager 109 may determine if one or more applications have taken over a primary use and/or control of the handheld computing device 200. In this decision block 575, the client request manager 109 may determine if another application, such as a telephone call, has been supported or executed by another application program module on the handheld computing device 200. Alternatively, the client request manager 109 may detect another application program module that has dominant use or utilizes a large section of the display screen 332 relative to a section which supports the video 400 being displayed.

If the client request manager 109 detects that an application has taken over a primary use and/or control of the handheld computing device 200 in decision block 575, such as in a situation of a telephone call been received by the handheld computing device 200, then the process proceeds to decision block 580. If the client request manager 109 does not detect any application taking over primary use and/or control of the handheld computing device 200 and decision block 575, then the process returns to block 515 of FIG. 5A.

In decision block 580, the client request manager 109 determines if the requested file segments 212 are at a lowest quality. If the client request manager 109 determines that the current file segments 212 in memory resources 119 have a high-quality relative to what was described in the meta-object 402, then the process proceeds to block 585 in which the client request manager determines if lower quality file segments 212 are available and if they are available, the client request manager 109 selects the lower quality file segments 212 while the other application module is dominating the use and/or control of the handheld computing device 200.

Once the other application module as relinquished dominate use and/or control the mobile computing device 200, then the client request manager 109 may permit the request for higher quality video file segments 212 depending upon the network conditions and conditions of the wireless handheld computing device 200. If in decision block 580 the client request manager 109 determines that the current video file segments 212 are already at a lowest quality, then the process proceeds back to block 515 of FIG. 5A.

Figure 6:
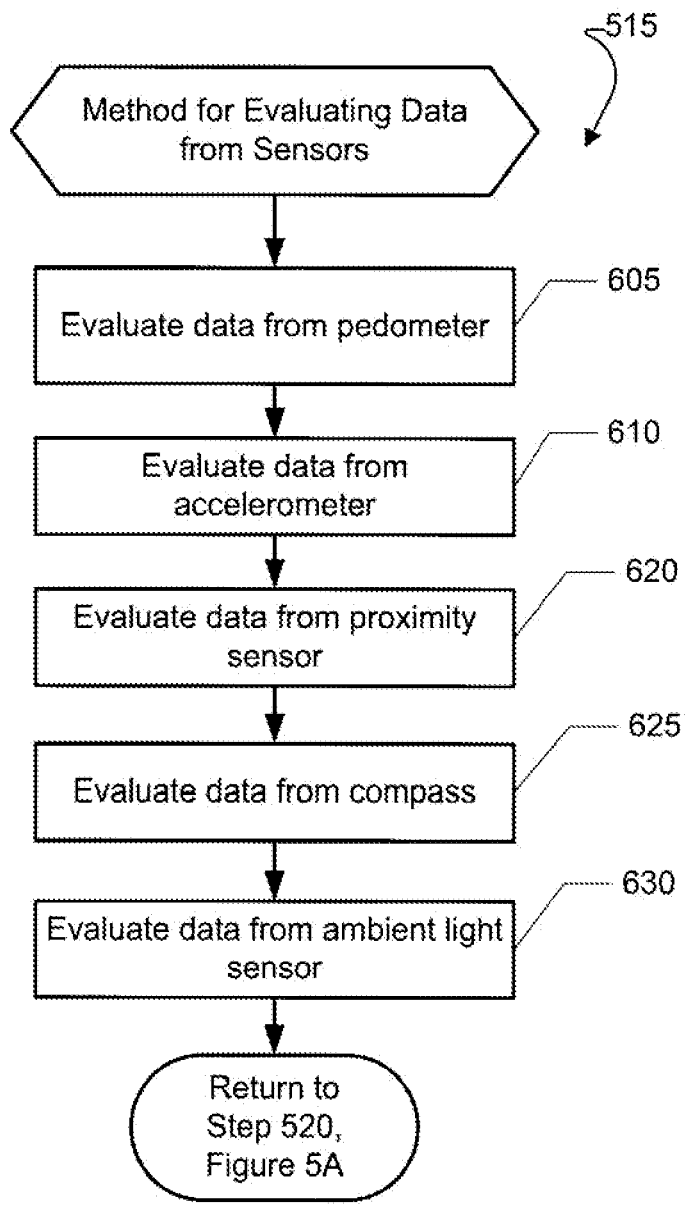
FIG. 6 is a flowchart illustrating a sub-method or a routine of FIG. 5A for evaluating data from sensors in a wireless handheld computing device.

FIG. 6 is a flowchart illustrating a sub-method or a routine 515 of FIG. 5A for evaluating data from sensors 125 in a wireless handheld computing device 200. Block 605 is the first block of routine 515 in which the client request manager 109 evaluates data from the pedometer sensor 125A. As discussed previously, data from the pedometer sensor 125A may indicate that the handheld computing device 200 is being carried by a person who is walking so that the client request manager 109 may calculate an estimate of time that the handheld computing device 200 may be present within a certain wireless network 206.

Next, in block 610, the client request manager 109 may evaluate data that it receives from the accelerometer 125B. The data from the accelerometer 125B may indicate to the client request manager 109 whether the handheld computing device 200 is within a moving vehicle or not. In block 620, the client request manager 109 may evaluate data from the proximity sensor 125C. The data from the proximity sensor 125C may indicate to the client request manager 109 that the handheld computing device 200 is being positioned next to a user's face in order to conduct a telephone call (typically).

Next, in block 625, the client request manager 109 may evaluate data that it receives from the compass 125D. The data from the compass 125D may indicate if the handheld computing device 200 is located within a motor vehicle or not.

In block 630, the client request manager 109 may evaluate data from an ambient light sensor 125E. The data from the ambient light sensor 125E may indicate to the client request manager 109 lighting conditions for the handheld computing device 200. The ambient light sensor 125E may detect low-level and high-level lighting conditions such as direct sunlight and operation of the handheld computing device 200 at night in the absence of sunlight. After block 630, the process returns to block 520 of FIG. 5A.

Figure 7:
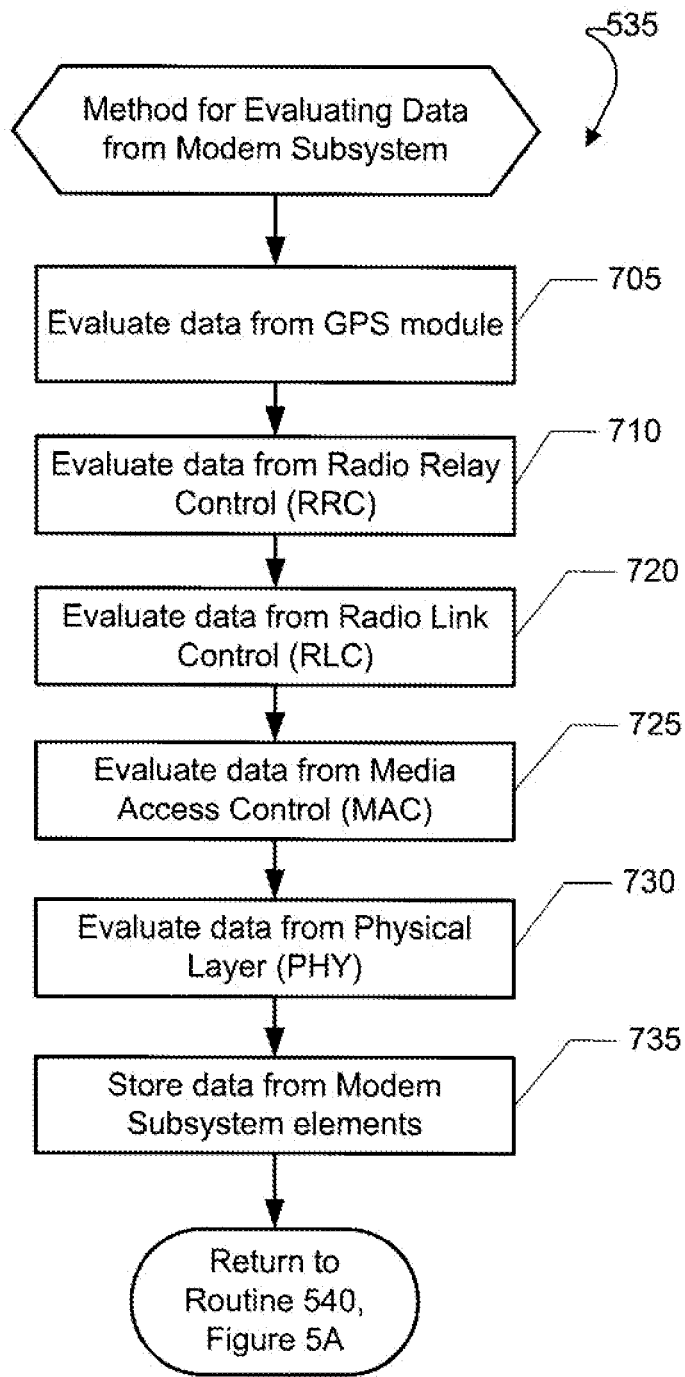
FIG. 7 is a flow chart illustrating a sub-method or a routine of FIG. 5A for evaluating data from a modem subsystem in a wireless handheld computing device.

FIG. 7 is a flow chart illustrating a sub-method or a routine 535 of FIG. 5A for evaluating data from a modem subsystem 133 in a wireless handheld computing device 200. Block 705 is the first block of routine 535 in which the client request manager 109 may evaluate data received from the GPS module 143. The GPS module 143 may provide information, such as, but not limited to, location, and speed or velocity of the handheld mobile computing device 200 to the streaming request manager 109. Specifically, the GPS module 143 may provide the latitude, longitude, altitude with regard to ellipsoid, altitude with regard to mean sea level, horizontal speed, vertical speed, and heading information.

In block 710, the client request manager 109 may evaluate data from the radio relay control ("RRC") module 137. The RRC module 137 may communicate information such as, but not limited to, high speed downlink packet access ("HSDPA") category information, enhanced uplink layer ("EUL") category information, and discontinuous reception/transmission ("DRX/DTX") configuration ("Config") information.

In block 720, the client request manager 109 may evaluate data from the radio link control ("RLC") module 135. The RLC module 135 may communicate throughput as well as radio link control ("RLC") protocol data unit ("PDU") size.

In block 720, the client request manager may evaluate data from the media access control ("MAC") module 139. The MAC layer module 139 may communicate uplink ("UL") information, such as, but not limited to, buffer status report ("BSR") information and enhanced dedicated channel ("EDCH") transport format ("TF") information.

In block 730, the client request manager 109 may evaluate data from the physical layer ("PHY") module 147. The physical layer 141 may communicate the downlink ("DL") information, such as, but not limited to, high speed transport block size ("HS-TBS"), modulation, channel quality indication ("CQI"), block error rate ("BLER") measurement, multi-input/multi-output ("MIMO"), receiver ("Rx") automatic gain control ("AGC"), as well as equalizer integrated circuit ("EQ/IC") receiver ("Rx") diversity ("D"). The physical layer 141 may also communicate uplink ("UL") information, such as, but not limited to, BLER, modulation, and transmitter ("Tx") automatic gain control ("AGC").

Other parameters monitored by the PHY module 141 include, but are not limited to, the following: the number of RAKE finger path which may allow the client request manager 109 to estimate the wireless channel profile, single or multiple path profile as understood by one of ordinary skill in the art; the common pilot channel ("CPICH") signal-to-noise ratio ("SNR") so that the client request manager 109 may predict fading channel conditions as understood by one of ordinary skill in the art; the channel quality indicator ("CQI") so that the client request manager 109 may predict fading channel conditions as understood by one of ordinary skill in the art; the reference signal received quality ("RSRQ") per antenna 372 so that the client request manager 109 may calculate the signal quality over the measurement bandwidth as well as to predict fading channel conditions as understood by one of ordinary skill in the art; and the rank indicator ("RI") so that the client request manager 109 may calculate the number of transmission layers in spatial multiplexing multiple in multiple out ("SU-MIMO") conditions as understood by one of ordinary skill in the art.

Next, in block 735, the data from the modem subsystem elements may be stored by the client request manager 109 in one or more of the memory resources 119. The process then returns to routine block 540 of FIG. 5A.

Figure 8:
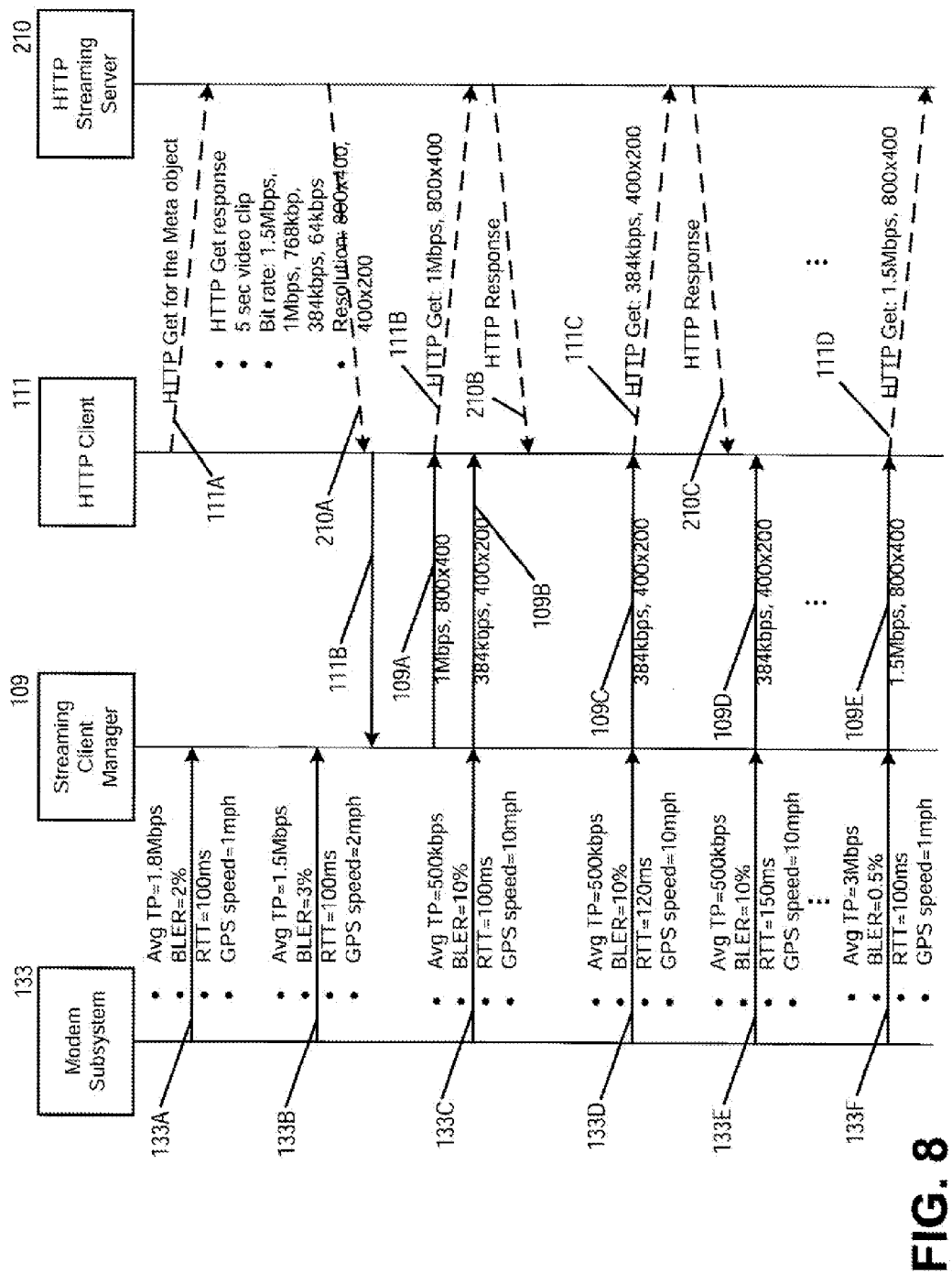
FIG. 8 is a state diagram illustrating communications between the streaming manager of a wireless handheld computing device and a server which has various video files for download by the wireless handheld computing device.

FIG. 8 is a state diagram illustrating communications between the streaming manager 109 of a wireless handheld computing device 200 and a server 210 which has various video files 212 for download by the wireless handheld computing device 200. The first communication 133A of the state diagram is sent from the modem subsystem 133 to the streaming client manager 109. The first communication 133A may comprise a status for the average transmission protocol ("TP"). The current status of the TP may indicate a rate of 1.8 megabits per second ("Mbps") that may be supported by the handheld computing device 109. The first communication 133A may also provide a status for the block error rate ("BLER"). The BLER for this communication 133A may comprise a magnitude of two percent.

The first communication 133A may also provide a status for the round-trip time ("RTT") between the handheld computing device 200 and the server 210. The RTT may comprise a magnitude of 100 milliseconds (ms). The first communication 133A may also provide status from the GPS module 143. The status from the GPS module 143 may indicate that the handheld computing device 109 is moving at a speed at approximately one mile an hour.

The second communication 111A may be sent from the http client 111 to request the meta-object 402 from the streaming server 210. The third communication 133B may indicate that the speed for the transmission protocol as decreased to 1.5 Mbps relative to the first communication 133A. The third communication 133B may also indicate that the BLER has increased to three percent, while the RTT remains the same at 100 ms. The GPS module 143 may indicate that the speed of the handheld computing device 109 has increased to two mph relative to the first communication 133A.

The fourth communication to 210A is sent from the server 210 to the http client 111 of the handheld computing device 109. The fourth communication 210A may comprise the meta-object file 402. The meta-object file 402 may indicate that the file segments 212 comprise lengths of approximately five seconds, while the options for bit rates for each of the segments include those at 1.5 Mbps, 1 Mbps, 768 Mbps, 384 Mbps, and 64 kbps. The meta-object file 402 may also indicate that the file segments 212 may have two different video resolutions: one at 800×400 and another at 400×200.

In the fifth communication 111B, the meta-object file 402 is passed to the client request manager 109 for review. In the six communication 109A, the client request manager 109 has already determined a speed for the first file segment 212 and its resolution: 1 Mbps and a resolution of 800×400. Prior to the six communication 109A and after the fifth communication 111B the comprising the meta-object file 402, the client request manager 109 may have executed blocks 510-550 of FIG. 5A.

In the seventh communication 111B, the http client 111 issues a request to the server 210 for the file segment 212 having a bit rate of 1 Mbps and a video resolution of 800×400. In the eighth communication 133C, the modem subsystem 133 indicates that the average transmission protocol speed has dropped to 500 kbps while the BLER has increased to ten percent. Meanwhile, the RTT remains the same at 100 ms while the GPS module 143 indicates that the handheld computing device 109 has increased to a speed of 10 mph relative to the third communication 133B.

Based on the conditions provided in the eighth communication 133C, the client request manager 109 determines just prior to the ninth communication 109B that the next file segment 212 that should be downloaded should have a bit rate of 1 Mbps and a lower video resolution of 400×200 compared to the six communication 109A that was previously issued by the client request manager 109. The client request manager 109 transmits this ninth communication to the http client 111.

However, because the streaming server 210 has not responded to the http client's last request, the http client 111 is unable to transmit the contents of the ninth communication 109B over to the streaming server 210. Only after the http client 111 receives the next communication from the streaming server to 10 may the http client 111 transmit its next request to the streaming server 210. This is the nature of the HTTP streaming protocol as is understood by one of ordinary skill in the art.

In the tenth communication 210B, the streaming server 210 provides its response to the last request from the http client 111 which was the seventh communication 111B. The tenth communication 210B may comprise the contents of the last request 111B which was a file segment having a bit rate of one Mbps and a video resolution of 800×400.

Next, in the eleventh communication 133D from the modem subsystem 133 to the client request manager 109, the conditions may indicate that the average transmission protocol has stayed the same at a bit rate of 500 kps while the BLER has also remained the same at ten percent. The eleventh communication 133D may indicate that the RTT has increased from 100 ms to 120 ms and the speed of the client computing device 109 has remained the same at ten MPH.

In the twelfth communication 109C, the client request manager 109 may have determined that the bit rate and a video resolution may remain the same relative to the last client request manager communication 109B that provided a bit rate of 384 kbps and a video resolution of 400×200. This twelfth communication 109C is transmitted from the client request manager 109 to the http client 111.

In the thirteenth communication 111C, the http client 111 may communicate with the streaming server 210 with a request for the next file segment 212 to have a bit rate of 384 kbps and a video resolution of 400×200. In the fourteenth communication 210C, the streaming server 210 may provide the requested file segment 212 having the bit rate of 384 kbps and a video resolution of 400×200.

Next, in the fifteenth communication 133E, the modem subsystem 133 may indicate that the average TP speed and the BLER have remained the same at 500 kbps and ten percent respectively. Modem subsystem 133 may also indicate that the RTT has increased from 120 ms to 150 ms and the speed has remained the same at 10 MPH.

Based on these conditions provided by the modem subsystem 133 in the fifteenth communication 133D, the client request manager 109 may decide to request segments 212 with bit rates and video resolutions equal to the last, twelfth request 109C in which the requested bit rate is at 384 kpbs and a video resolution of 400×200. The client request manager 109 transmits this data in the sixteenth communication 109D.

In the seventeenth communication 133F, the modem subsystem 133 may indicate that the bit rate for the transmission protocol has increased from 500 kbps to 3 Mbps and that the BLER has decreased from ten percent to 0.5 percent. The seventeenth communication 133F may also indicate that the RTT has decreased from 150 ms to 100 ms and that speed of the handheld computing device 109 has decreased from 10 MPH to 1 MPH.

In view of the conditions provided in the seventeenth communication 133F and after the client request manager has executed at least blocks 510-550 of FIG. 5A, the client request manager 109 may request file segments 212 having a bit rate of 1.5 Mbps and a relatively high-resolution of 800× 400. Subsequently, the http client 111 transmits the request of file segments 212 having a bit rate of 1.5 Mbps and a high-resolution of 800×400 to the streaming server 210 in the nineteenth communication 111D.

While specific values have been discussed with reference to the state diagram in FIG. 8, one of ordinary skill in the art recognizes that other magnitudes for the TP, BLER, RTT, and GPS are possible and within the scope of the invention. Further, one of ordinary skill in the art recognizes that other factors monitored by both the modem subsystem 133 and the application subsystem 102 are within the scope of the invention.

One of ordinary skill in the art recognizes that a home personal computer using the client request manager 109 to access content over the Internet is within the scope of the invention. The client request manager 109 would be implemented and run on an operating system ("OS"), such as Windows™, and would typically monitor bandwidth (bit rate of the chosen streaming video) and the multimedia buffer status (bit consumption rate of the video stream) and make decisions on which higher or lower resolution content to that in the next file segment 212.

A mobile handset using the client request manager 109 may be implemented either on an OS comprising Windows™ and connected to WWAN (such as Gobi), or the client request manager 109 may be provided within the mobile phone on an OS such as ANDROID™, SYMBIAN™, or mobile WINDOWS™ brand mobile operating systems. The client request manager 109 may also monitor bandwidth and multimedia buffer status similar to what was discussed above. However, in this mobile phone environment, the client request manager 109 may also take into account via the GPS module 143 and the accelerometer 125B that a user is moving and accelerating. The client request manager 109 may notice that statistically when the user has accelerated similarly in the past, that the bandwidth has decreased. Therefore, if the client request manager 109 assumes that the bandwidth will can decrease in the future, then the request manager 109 may make an intelligent decision to request a lower video resolution than what may be support under current detected network conditions.

One of ordinary skill in the art recognizes that a more advanced client request manager 109 may take into account the signal-to-noise ("SNR"). For example, if the handheld computing device 109 stopped moving and a higher bit rate may be available, even though the client request manager 109 but typically request a higher bit rate, the client request manager 109 may notice that the SNR is low, and thus does not request a higher bit rate stream for the next set of file segments 212.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/ or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for optimizing media playback quality for a wireless handheld computing device, the method comprising:
    receiving a meta-object describing media to be downloaded to the wireless handheld computing device via a communications network, the media comprising a plurality of file segments with each file segment having a plurality of available file segment versions at different bit rate and resolution combinations, wherein the plurality of available file segment versions includes a plurality of file segment versions at different bit rates for a given resolution and a plurality of file segment versions at different resolutions for a given bit rate;
    reviewing options for the different bit rate and resolution combinations described in the meta-object;
    evaluating data from an application subsystem;
    evaluating data from a modem subsystem;
    for a first file segment, selecting a first file segment version for download that optimizes media playback on the wireless handheld computing device based on the different bit rate and resolution combinations and the data received from at least one of the application subsystem and modem subsystem;
    downloading the selected first file segment version;
    for a second file segment, selecting a second file segment version for download that optimizes media playback on the wireless handheld computing device based on the different bit rate and resolution combinations and the data received from at least one of the application subsystem and modem subsystem;
    downloading the selected second file segment version;
    determining if the wireless handheld computing device has received a phone call; and
    if a phone call has been received by the wireless handheld computing device, then determining if at least one of the first and second selected file segment versions is at a lowest quality.

2. The method of claim 1, further comprising: evaluating data from one or more sensors.

3. The method of claim 2, further comprising: estimating future conditions of a wireless network based on data from at least one of the sensors, application subsystem, and modem subsystem.

4. The method of claim 1, further comprising: estimating future conditions of a wireless network based on data from at least one of the application subsystem and modem subsystem.

5. The method of claim 1, further comprising: determining if an application program module has taken primary control over the wireless handheld computing device.

6. The method of claim 5, further comprising: if an application program module has taken primary control over the wireless handheld computing device, then determining if at least one of the first and second selected file segment versions is at a lowest quality.

7. The method of claim 1, wherein the wireless handheld computing device comprises at least one of a mobile telephone, a personal digital assistant, a pager, a smartphone, a navigation device, and a hand-held computer with a wireless connection or link.

8. The method of claim 1, wherein the media comprises at least one of video, audio, images, and a combination thereof.

9. A computer system for optimizing media playback for a wireless handheld computing device, the system comprising:
    a processor operable to:
        receive a meta-object describing media to be downloaded to the wireless handheld computing device via a communication network, the media comprising a plurality of file segments with each file segment having a plurality of available file segment versions at different bit rate and resolution combinations, wherein the plurality of available file segment versions includes a plurality of file segment versions at different bit rates for a given resolution and a plurality of file segment versions at different resolutions for a given bit rate;
        review options for the different bit rate and resolution combinations described in the meta-object;
        evaluate data from an application subsystem;
        evaluate data from a modem subsystem;
        for a first file segment, select a first file segment version for download that optimizes media playback on the wireless handheld computing device based on the different bit rate and resolution combinations and the data received from at least one of the application subsystem and modem subsystem;
        download the selected first file segment version;
        for a second file segment, select a second file segment version for download that optimizes media playback on the wireless handheld computing device based on the different bit rate and resolution combinations and the data received from at least one of the application subsystem and modem subsystem;
        download the selected second file segment version;
        determine if the wireless handheld computing device has received a phone call; and
        if a phone call has been received by the wireless handheld computing device, then determine if at least one of the first and second selected file segment versions is at a lowest quality.

10. The system of claim 9, wherein the processor is further operable to: evaluate data from one or more sensors.

11. The system of claim 10, wherein the processor is further operable to: estimate future conditions of a wireless network based on data from at least one of the sensors, application subsystem, and modem subsystem.

12. The system of claim 9, wherein the processor is further operable to: estimate future conditions of a wireless network based on data from at least one of the application subsystem and modem subsystem.

13. The system of claim 9, wherein the processor is further operable to: determine if an application program module has taken primary control over the wireless handheld computing device.

14. The system of claim 13, wherein the processor is further operable to: determine if at least one of the first and second selected file segment versions is at a lowest quality.

15. The system of claim 9, wherein the wireless handheld computing device comprises at least one of a mobile telephone, a personal digital assistant, a pager, a smartphone, a navigation device, and a hand-held computer with a wireless connection or link.

16. The system of claim 9, wherein the media comprises at least one of video, audio, images, and a combination thereof.

17. A computer system for managing one or more memory resources of a wireless handheld computing device, the system comprising:
    means for receiving a meta-object describing media to be downloaded to the wireless handheld computing device via a communication network, the media comprising a plurality of file segments with each file segment having a plurality of available file segment versions at different bit rate and resolution combinations, wherein the plurality of available file segment versions includes a plurality of file segment versions at different bit rates for a given resolution and a plurality of file segment versions at different resolutions for a given bit rate;

means for reviewing options for the different bit rate and resolution combinations described in the meta-object;

means for evaluating data from an application subsystem;

means for evaluating data from a modem subsystem;

for a first file segment, means for selecting a first file segment version for download that optimizes media playback on the wireless handheld computing device based on the different bit rate and resolution combinations and the data received from at least one of the application subsystem and modem subsystem;

means for downloading the selected first file segment version;

for a second file segment, means for selecting a second file segment version for download that optimizes media playback on the wireless handheld computing device based on the different bit rate and resolution combinations and the data received from at least one of the application subsystem and modem subsystem; and means for downloading the selected second file segment version;

means for determining if the wireless handheld computing device has received a phone call; and means for determining if at least one of the first and second selected file segment versions is at a lowest quality if a phone call has been received by the wireless handheld computing device.

18. The system of claim 17, further comprising: means for evaluating data from one or more sensors.

19. The system of claim 18, further comprising: means for estimating future conditions of a wireless network based on data from at least one of the sensors, application subsystem, and modem subsystem.

20. The system of claim 17, further comprising: means estimating future conditions of a wireless network based on data from at least one of the application subsystem and modem subsystem.

21. The system of claim 17, further comprising: means for determining if an application program module has taken primary control over the wireless handheld computing device.

22. The method of claim 17, further comprising: means for determining if at least one of the first and second selected file segment versions is at a lowest quality and if an application program module has taken primary control over the wireless handheld computing device.

23. The system of claim 17, wherein the wireless handheld computing device comprises at least one of a mobile telephone, a personal digital assistant, a pager, a smartphone, a navigation device, and a hand-held computer with a wireless connection or link.

24. The system of claim 17, wherein the media comprises at least one of video, audio, images, and a combination thereof.

25. A computer program product comprising a computer usable device having a computer readable program code embodied therein, said computer readable program code adapted to be executed to implement a method for optimizing medial playback for a wireless handheld computing device, said method comprising:

receiving a meta-object describing media to be downloaded to the wireless handheld computing device, the media comprising a plurality of file segments with each file segment having a plurality of available file segment versions at different bit rate and resolution combinations, wherein the plurality of available file segment versions includes a plurality of file segment versions at different bit rates for a given resolution and a plurality of file segment versions at different resolutions for a given bit rate;

reviewing options for the different bit rate and resolution combinations described in the meta-object;

evaluating data from an application subsystem;

evaluating data from a modem subsystem;

for a first file segment, selecting a first file segment version for download that optimizes media playback on the wireless handheld computing device based on the different bit rate and resolution combinations and the data received from at least one of the application subsystem and modem subsystem;

downloading the selected first file segment version;

for a second file segment, selecting a second file segment version for download that optimizes media playback on the wireless handheld computing device based on the different bit rate and resolution combinations and the data received from at least one of the application subsystem and modem subsystem;

downloading the selected second file segment version;

determining if the wireless handheld computing device has received a phone call; and if a phone call has been received by the wireless handheld computing device, then determining if at least one of the first and second selected file segment versions is at a lowest quality.

26. The computer program product of claim 25, wherein the program code implementing the method further comprises: evaluating data from one or more sensors.

27. The computer program product of claim 26, wherein the program code implementing the method further comprises: estimating future conditions of a wireless network based on data from at least one of the sensors, application subsystem, and modem subsystem.

28. The computer program product of claim 25, wherein the program code implementing the method further comprises: estimating future conditions of a wireless network based on data from at least one of the application subsystem and modem subsystem.

29. The computer program product of claim 25, wherein the program code implementing the method further comprises: determining if an application program module has taken primary control over the wireless handheld computing device.

30. The computer program product of claim 25, wherein the program code implementing the method further comprises: determining if an application program module has taken primary control over the wireless handheld computing device, then determining if at least one of the first and second selected file segment is at a lowest quality.

31. The computer program product of claim 25, wherein the wireless handheld computing device comprises at least one of a mobile telephone, a personal digital assistant, a pager, a smartphone, a navigation device, and a hand-held computer with a wireless connection or link.

32. The computer program product of claim 25, wherein the media comprises at least one of video, audio, images, and a combination thereof.

* * * * *